(12) United States Patent
Miki

(10) Patent No.: US 10,653,976 B2
(45) Date of Patent: May 19, 2020

(54) WATER PURIFICATION APPARATUS OF FUEL CELL GENERATION SYSTEM

(71) Applicant: HONDA MOTOR CO., LTD, Tokyo (JP)

(72) Inventor: Tatsuya Miki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 15/849,778

(22) Filed: Dec. 21, 2017

(65) Prior Publication Data

US 2018/0178143 A1    Jun. 28, 2018

(30) Foreign Application Priority Data

Dec. 26, 2016 (JP) ................................. 2016-251926

(51) Int. Cl.
*C02F 1/42* (2006.01)
*B01D 15/24* (2006.01)
(Continued)

(52) U.S. Cl.
CPC ........... *B01D 15/242* (2013.01); *B01D 15/14* (2013.01); *B01D 15/361* (2013.01); *C02F 1/42* (2013.01);
(Continued)

(58) Field of Classification Search
CPC .... B01D 15/242; B01D 15/361; B01D 15/14; C02F 1/42; C02F 2001/427;
(Continued)

(56) References Cited

U.S. PATENT DOCUMENTS 6,190,528 B1    2/2001 Li et al.
2005/0115884 A1  6/2005 Suzuki et al.
(Continued)

FOREIGN PATENT DOCUMENTS

JP    S57-021092 U    2/1982
JP    2000-325952 A   11/2000
(Continued)

OTHER PUBLICATIONS

Combined Search and Examination Report dated Jun. 22, 2018, issued in counterpart British Application No. 1721667.2. (7 pages).
(Continued)

*Primary Examiner* — Matthew O Savage
(74) *Attorney, Agent, or Firm* — Westerman, Hattori, Daniels & Adrian,

(57) ABSTRACT

A water purification apparatus includes a bottomed cylindrical container tank, a lid member for fluid-tightly closing an upper opening of the container tank, an upper filter which forms an upper space between the lid member and itself, a lower filter which forms a lower space between a bottom plate of the container tank and itself, a water passage pipe which passes through the upper and lower filters and which establishes a communication between the upper and lower spaces, and an ion-exchange resin loaded in a space defined by the container tank, the upper and lower filters and the water passage pipe. The lid member has a water supply pipe for supplying water to the upper space, and an overflow pipe which connects to the water passage pipe. A water conveyance pipe for discharging the pure water in the container tank to outside is connected to the lower space.

4 Claims, 4 Drawing Sheets

(51) Int. Cl.
- *B01D 15/36* (2006.01)
- *B01D 15/14* (2006.01)
- *H01M 8/04291* (2016.01)
- *H01M 8/0612* (2016.01)
- *H01M 8/04119* (2016.01)
- *C02F 103/04* (2006.01)
- *C02F 103/02* (2006.01)
- *H01M 8/06* (2016.01)
- *H01M 8/0662* (2016.01)
- *B01J 47/022* (2017.01)

(52) U.S. Cl.
CPC ........ *H01M 8/04291* (2013.01); *B01J 47/022* (2013.01); *C02F 2001/427* (2013.01); *C02F 2103/02* (2013.01); *C02F 2103/04* (2013.01); *C02F 2201/003* (2013.01); *C02F 2303/10* (2013.01); *H01M 8/04156* (2013.01); *H01M 8/04164* (2013.01); *H01M 8/06* (2013.01); *H01M 8/0618* (2013.01); *H01M 8/0662* (2013.01); *H01M 8/0687* (2013.01)

(58) Field of Classification Search
CPC ............ C02F 2201/003; C02F 2103/04; C02F 2303/10; C02F 2103/02; C02F 2301/04; H01M 8/0618; H01M 8/04164; H01M 8/04291; H01M 8/06; H01M 8/04156; H01M 8/0662; H01M 8/0687; B01J 47/012; B01J 47/022

USPC .......................... 210/288, 289, 248; 429/410
See application file for complete search history.

(56) References Cited

U.S. PATENT DOCUMENTS

| | | | |
|---|---|---|---|
| 2007/0000791 A1* | 1/2007 | Arai | .......................... C02F 1/42 |
| | | | 205/746 |
| 2007/0264554 A1 | 11/2007 | Fujita et al. | |
| 2016/0043421 A1 | 2/2016 | Yuzuriha | |

FOREIGN PATENT DOCUMENTS

| | | |
|---|---|---|
| JP | 2010-192225 A | 9/2010 |
| JP | 2011-083744 A | 4/2011 |
| JP | 2011-131182 A | 7/2011 |
| JP | 2011-228183 A | 11/2011 |
| JP | 2014-207060 A | 10/2014 |
| WO | 2014/167908 A1 | 10/2014 |

OTHER PUBLICATIONS

Office Action dated Oct. 8, 2019, issued in counterpart JP application No. 2016-251926, with English translation. (5 pages).

* cited by examiner

WATER PURIFICATION APPARATUS OF FUEL CELL GENERATION SYSTEM

CROSS REFERENCE TO RELATED APPLICATIONS

This application is based on Japanese Patent Application (No. 2016-251926) filed on Dec. 26, 2016, the contents of which are incorporated herein by reference.

TECHNICAL FIELD

The present invention relates to a water purification apparatus of a fuel cell generation system, which refines water generated as a result of electric power generation in fuel cells to produce pure water.

BACKGROUND ART

Fuel cells generate electric energy through electrochemical reaction between fuel gas and oxidizing gas. As fuel gas supplied to fuel cells, hydrogen gas is used which is obtained by steam reforming hydrocarbon-based raw fuel.

In the steam reforming process described above, an amount of water which corresponds to an amount of steam used for the reforming reaction needs to be supplied to a reformer. Although there are methods in which such water is supplied from outside, a method attracts people's attention in which water contained in exhaust gas generated as a result of electric power generation in fuel cells is circulated as water needed for the reforming process. In a fuel cell generation system using the latter method, condensate resulting from recovering water contained in exhaust gas from the fuel cells needs to be circulated after it has been refined to pure water and stored. Patent literatures 1 and 2 disclose apparatuses for reforming and purifying condensate to produce pure water.

RELATED ART LITERATURE

Patent Literature

Patent Literature 1: JP-A-2011-131182
Patent Literature 2: JP-A-2014-207060

SUMMARY OF THE INVENTION

Problem that the Invention is to Solve

In the apparatus described in patent literature 1, a water guiding pipe is disposed at a center of a bottomed container, and an ion-exchange resin is loaded around the water guiding pipe in the bottomed container. Then, condensate which is supplied from a vertical communication path provided in a lid member into the water guiding pipe is passed through the ion-exchange resin from a bottom toward a top thereof for purification, and pure water is discharged from a water guiding path which is provided on an upper side of the bottomed container. In the apparatus described in patent literature 2, an apparatus main body is provided in which an ion-exchange resin is loaded between a lower filter and an upper filter. Then, condensate which is supplied from a water introducing port provided in a lower side of the apparatus main body is passed through the ion-exchange resin from a bottom toward a top thereof for purification, and pure water is discharged from a water discharge port provided in an upper side of the apparatus main body.

In this way, in the respective apparatuses of patent literatures 1 and 2, the condensate is purified by being passed through the ion-exchange resin from the bottom to the top thereof, and the pure water is discharged from the upper port. Thus, no space for storing pure water exists in an interior of the apparatus. Because of this, the fuel cell generation system needs a separate tank for storing pure water discharged from the apparatus.

An object of the invention is to provide a water purification apparatus of a fuel cell generation system, which enables to hold refined pure water.

Means for Solving the Problem

With a view to achieving the object described above, according to an invention of (1), there is provided a water purification apparatus (for example, a water purification apparatus 10 in an embodiment) of a fuel cell generation system, which refines water (for example, condensate in an embodiment) generated as a result of electric power generation in a fuel cell to produce pure water, including:

a bottomed cylindrical container tank (for example, a container tank 11 in an embodiment);

a lid member (for example, a lid member 12 in an embodiment) for fluid-tightly closing an opening portion (for example, an opening portion 21 in an embodiment) which opens upward of the container tank;

an upper filter (for example, an upper filter 13 in an embodiment) which is disposed at an upper portion of a container space (for example, a container space S in an embodiment) formed from the container tank and the lid member, and which forms an upper space (for example, an upper space 52 in an embodiment) between the lid member and the upper filter;

a lower filter (for example, a lower filter 14 in an embodiment) which is disposed at a lower portion of the container space, and which forms a lower space (for example, a lower space 51 in an embodiment) between a bottom portion (for example, a bottom plate 25 in an embodiment) of the container tank and the lower filter;

a water passage pipe (for example, a water passage pipe 15 in an embodiment) which passes through the upper filter and the lower filter, and which is disposed substantially at a center of the container tank to establish a communication between the upper space and the lower space; and an ion-exchange resin (for example, an ion-exchange resin 16 in an embodiment) which is loaded in a space defined by the container tank, the upper filter, the lower filter, and the water passage pipe, wherein the lid member has a water supply channel (for example, a water supply pipe 38 in an embodiment) for supplying the water to the upper space, and an overflow channel (for example, an overflow pipe 39 in an embodiment) which connects to the water passage pipe, and a first discharge channel (for example, a water conveyance pipe 27 in an embodiment) for discharging the pure water in the container tank to outside is connected to the lower space.

According to an invention of (2), in the invention of (1), a second discharge channel (for example, a discharge pipe 28 in an embodiment), which is different from the first discharge channel, for discharging the pure water in the container tank is connected to the lower space.

According to an invention of (3), in the invention of (1), the container tank has a cylindrical shape, and the upper filter has a slit-shaped aperture (for example, a slit-shaped aperture 41 in an embodiment) whose opening area increases as the slit-shaped aperture separates from a water falling point (for example, a water falling point P in an embodiment) where the water supplied from the water supply channel falls.

According to an invention of (4), in the invention of (1), the upper filter has an air reservoir portion (for example, a projecting portion 43 in an embodiment) which is recessed toward the upper space on a circumference of the water passage pipe.

According to an invention of (5), in the invention of (1), the water is condensate resulting from recovering water contained in exhaust gas discharged from the fuel cell.

Advantages of the Invention

According to the invention of (1), extra pure water which is not discharged from the first discharge channel is stored in the water supply pipe within the container tank, and when the water supply pipe is filled with the pure water, the extra pure water overflows from an upper end of the water passage pipe by way of the overflow pipe. In this way, since the water passage pipe in the container tank can be made use of as a pure water storage tank, there is no need to provide a tank for storing pure water produced by the water purification apparatus in the fuel cell generation system. As a result, it is possible to realize a reduction in costs and installation space of the fuel cell generation system.

According to the invention of (2), in the case where water inside the container tank needs to be discharged to empty the container tank, the water inside the container tank is discharged from the second discharge channel connected to the lower space. The water discharged through the second discharge channel is pure water which has passed through the ion-exchange resin, and neither condensate nor a mixture containing condensate is discharged, thereby making it possible to reduce the influence of the discharged water on soil or water in environment.

According to the invention of (3), since the upper filter has the slit-shaped aperture whose opening area increases as the slit-shaped aperture separates from the water falling point P where the water supplied from the water supply channel falls, the flow rate of water supplied into the container space will never be uneven according to a location on the upper filter, thereby making it possible to realize the uniform flow rate. As a result, water is supplied into the container space in such a state that water is allowed to flow over the whole surface of the upper filter at substantially the same flow rate, whereby the utilization factor of ion-exchange resin can be made to average out.

According to the invention of (4), since the air reservoir portion is provided around the upper portion of the water passage pipe, the replacement of air within the container space with water supplied thereinto from the water supply channel is promoted, whereby water flows smoothly into the container space.

According to the invention of (5), condensate resulting from recovering water contained in exhaust gas discharged from the fuel cell can be refined and purified into pure water by the ion-exchange resin.

MODE FOR CARRYING OUT THE INVENTION

Hereinafter, an embodiment of the invention will be described by reference to the drawings. A water purification apparatus of an embodiment according to the invention is provided in a fuel cell generation system which includes fuel cells. Fuel cells generate electric energy through electro-chemical reaction between fuel gas and oxidizing gas. The water purification apparatus of this embodiment refines condensate resulting from recovering water contained in exhaust gas discharged from the fuel cells into pure water and stores part of the pure water therein.

Figure 1:
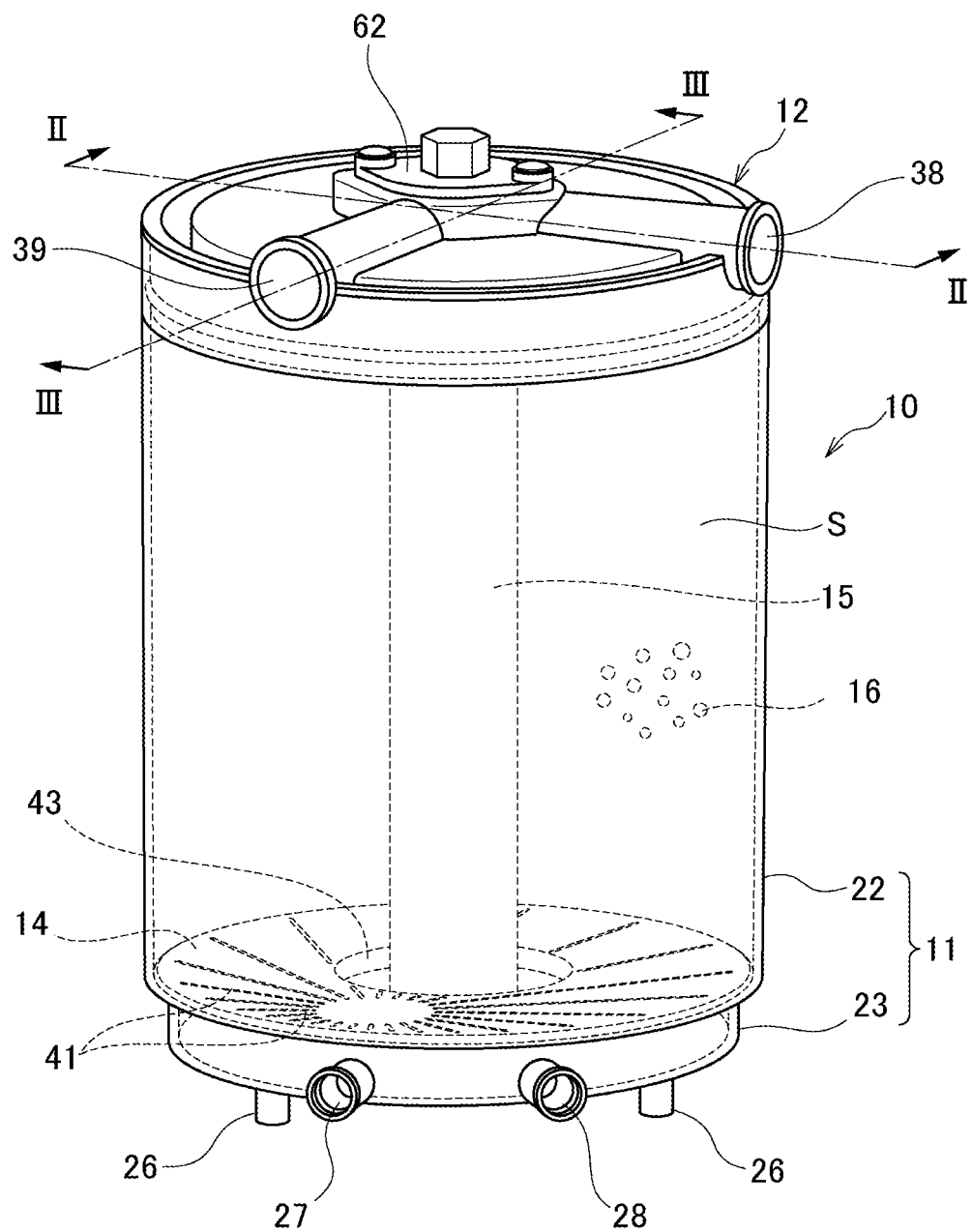
FIG. 1 is a partially see-through external perspective view of a water purification apparatus of a fuel cell generation system according to an embodiment of the invention.
Figure 2:
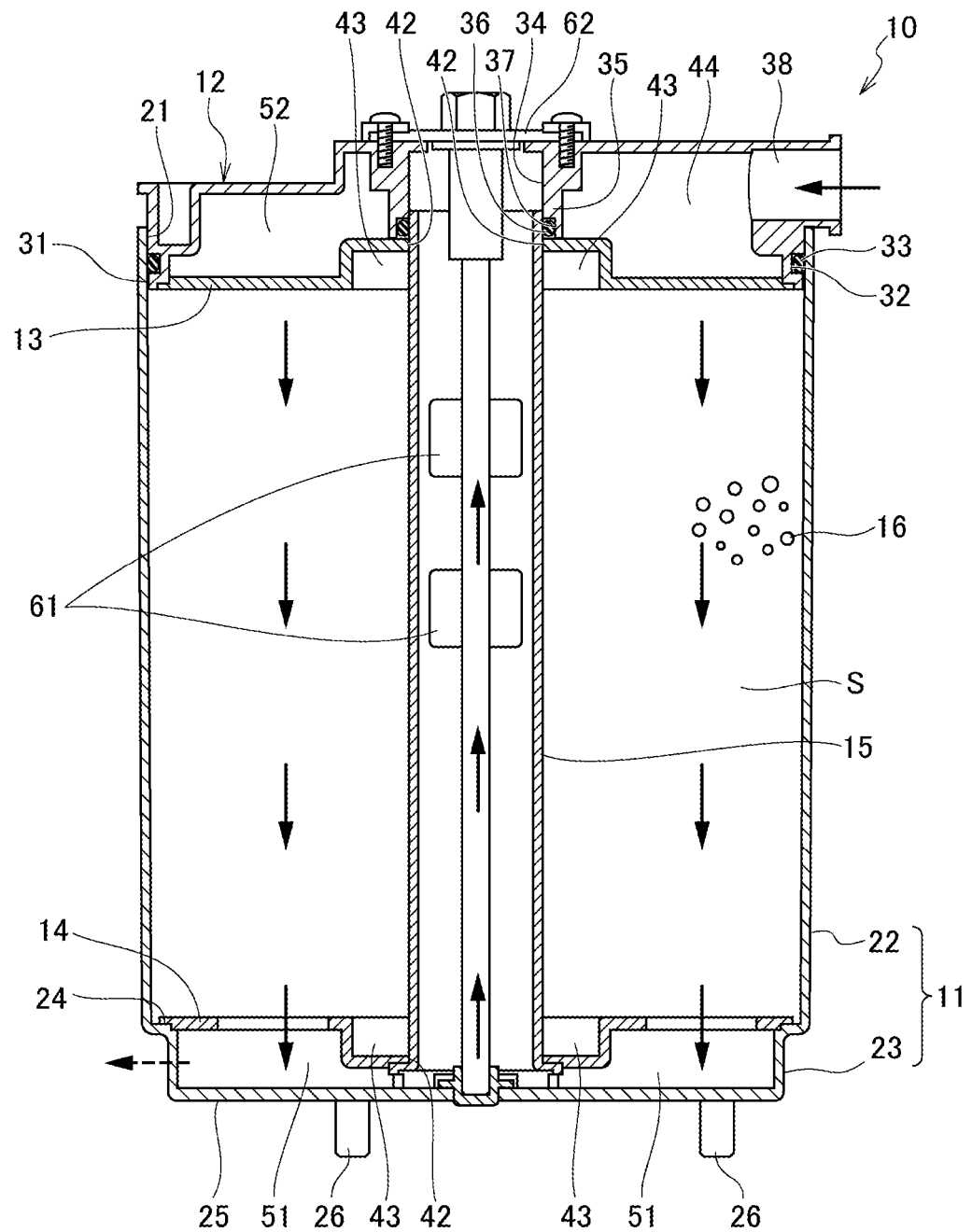
FIG. 2 is a sectional view of the water purification apparatus shown in FIG. 1 taken along a line II-II.
Figure 3:
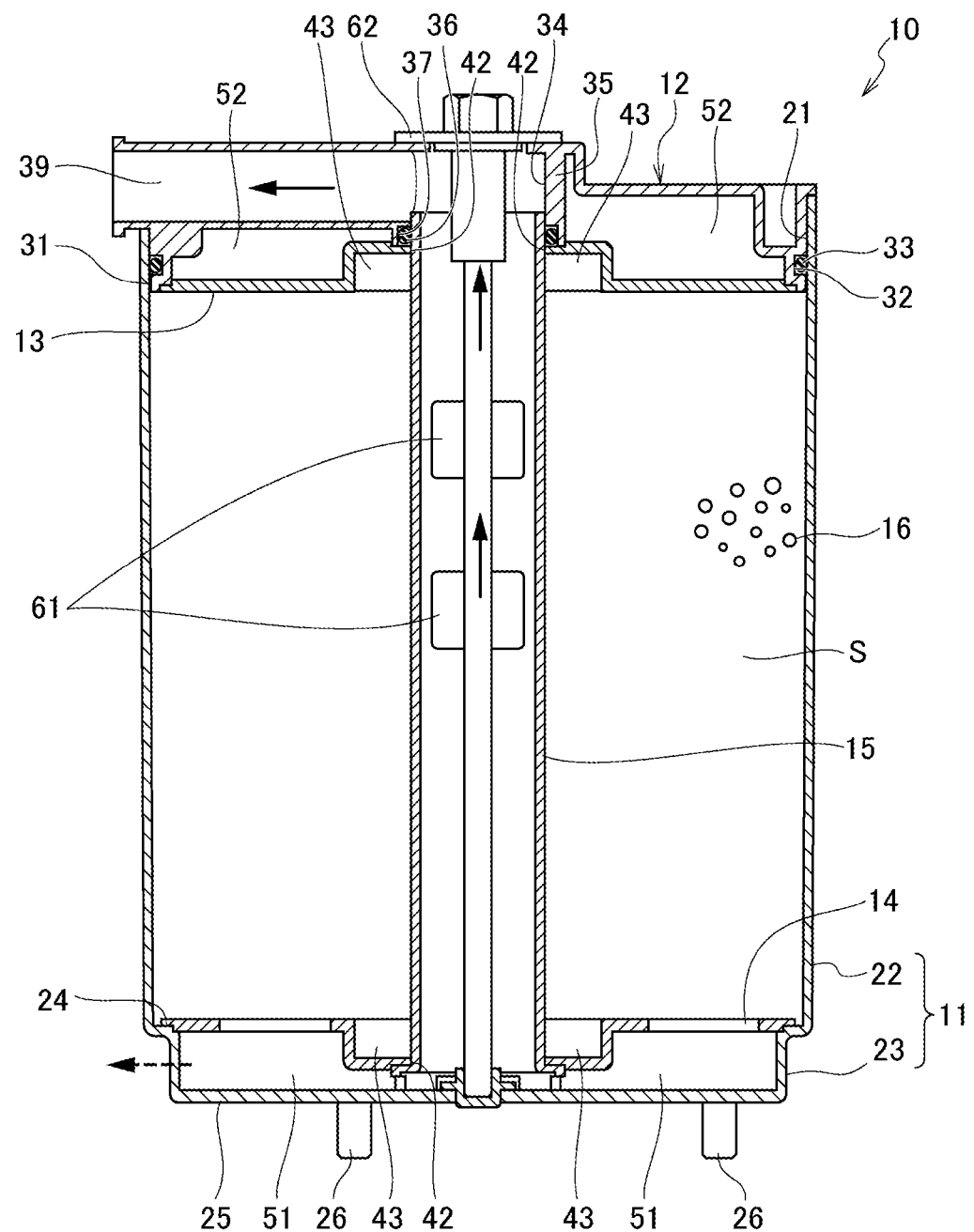
FIG. 3 is a sectional view of the water purification apparatus shown in FIG. 1 taken along a line III-III.

FIG. 1 is a partially see-through external perspective view of the water purification apparatus of a fuel cell generation system according to the embodiment of the invention. FIG. 2 is a sectional view of the water purification apparatus shown in FIG. 1 taken along a line II-II. FIG. 3 is a sectional view of the water purification apparatus shown in FIG. 1 taken along a line III-III. The water purification apparatus 10 shown in FIGS. 1 to 3 includes a container tank 11, a lid member 12, an upper filter 13, a lower filter 14, a water passage pipe 15, and an ion-exchange resin 16.

The container tank 11 is a container having a bottomed cylindrical shape and has an opening portion 21 which is opened upward. A plurality of leg portions 26 are provided on a bottom plate 25 of the container tank 11 so as to support the container tank 11.

The container tank 11 has a tank main body 22 having a large diameter and an auxiliary tank portion 23 having a smaller diameter than the diameter of the tank main body 22 and formed continuously to a lower portion of the tank main body 22. A step portion 24 is formed between the tank main body 22 and the auxiliary tank portion 23. A water conveyance pipe 27 constituting a first discharge channel which communicates with an interior space of the auxiliary tank portion 23 and a discharge pipe 28 constituting a second discharge channel are provided in the auxiliary tank portion 23 so as to extend radially outward.

The lid member 12 is designed to fit into the opening portion 21 of the container tank 11 to fluid-tightly close the opening portion 21. The lid member 12 has a slightly smaller outside diameter than an inside diameter of the tank main body 22, and includes an annular fitting portion 31 which fits into the opening portion 21. An O-ring 33 is installed in an O-ring groove 32 formed on an outer circumferential surface of the fitting portion 31. The lid member 12 fits in the container tank 11 via the O-ring 33, and a container space S is defined by the container tank 11 and the lid member 12.

An annular rib 35 which defines a through hole 34 passing vertically through the lid member 12 is provided at a center of the lid member 12. An O-ring groove 37 is formed on an inner circumferential surface of the annular rib 35 for installation of an O-ring 36, so that an upper end portion of a water passage pipe 15, which will be described later, fits fluid-tightly in the annular rib 35 via the O-ring 36.

Further, a water supply pipe 38 constituting a water supply channel which communicates with the interior space S of the container tank 11, and an overflow pipe 39 constituting an overflow channel which communicates with the through hole 34 formed at the center of the lid member 12 are provided in the lid member 12.

Figure 4:
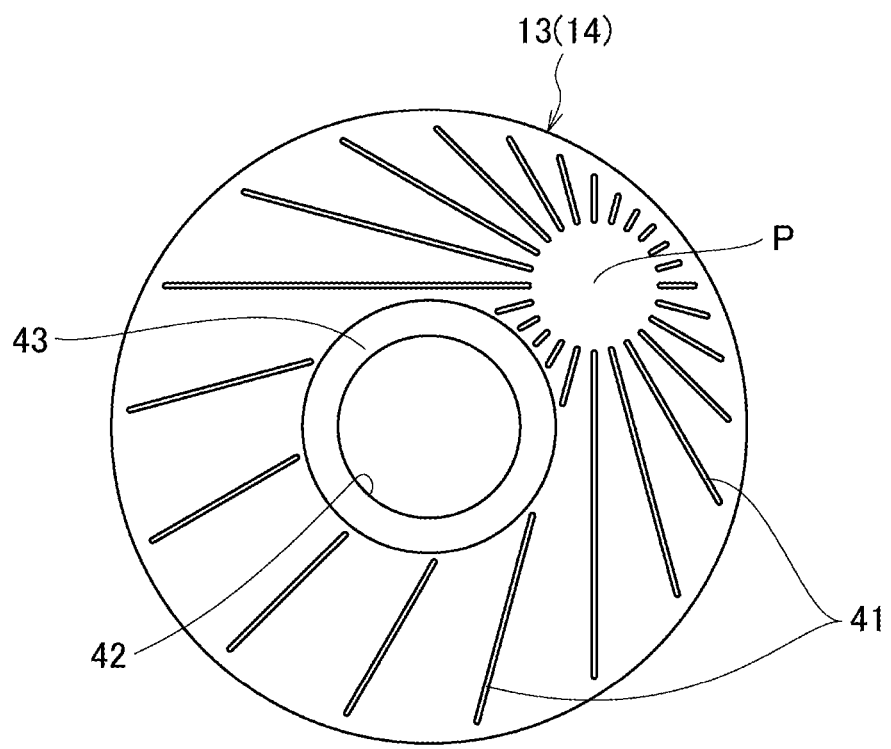
FIG. 4 is a plan view of an upper filter.

An upper filter 13 and a lower filter 14 are made up of the same member, and are disposed at an upper portion and a lower portion of the container tank 11 (the container space S), respectively, with their front and rear surfaces oriented in opposite directions. As shown in FIG. 4, the upper filter 13 and the lower filter 14 are each formed into a substantially circular disc plate-shaped shape and have a plurality of slit-shaped apertures 41. A cylindrical projecting portion 43 which projects in a thickness direction is formed at a center of each of the upper filter 13 and the lower filter 14. The projecting portion 43 functions as an air reservoir portion. The projecting portions 43 has a through hole 42 which fits on the water passage pipe 15.

The lower filter 14 is disposed to be locked on the step portion 24 between the tank main body 22 and the auxiliary tank portion 23 within the container tank 11 with the projecting portion 43 oriented downward. A lower space 51 is formed below the lower filter 14 in the auxiliary tank portion 23 by providing the lower filter 14 within the container tank 11.

The upper filter 13 is disposed at an upper portion of the container tank 11 with the projecting portion 43 oriented upward, and an upper surface of an outer circumferential portion of the upper filter 13 is held by the lid member 12. An upper space 52 is formed between the upper filter 13 and the lid member 12 by providing the upper filter 13 within the container tank 11.

The plurality of slit-shaped apertures 41 which are provided in the upper filter 13 (the lower filter 14) are set so that their opening areas increase as the slit-shaped apertures 41 separate from a water falling point P (refer to FIG. 4) in an opening portion 44 which communicates with the container space S, where water (condensate) supplied from the water supply pipe 38 provided in the lid member 12 falls.

The water passage pipe 15 penetrates through the through holes 42 of the upper filter 13 and the lower filter 14. A lower end of the water passage pipe 15 is situated in the lower space 51 which lies below the lower filter 14, whereas an upper end of the water passage pipe 15 fits in the annular rib 35 of the lid member 12 by way of the O-ring 36. By adopting this configuration, the lower space 51 of the container tank 11 communicates with the through hole 34 in the annular rib 35. Thus, as has been described heretofore, since the overflow pipe 39 is provided to communicate with the through hole 34, the lower space 51 communicates with the overflow pipe 39 by way of the water passage pipe 15 and the through hole 34.

Float sensors 61 which detect a level of pure water stored in the water passage pipe 15 is provided in an interior of the water passage pipe 15 by being inserted into the water passage pipe 15 from above the through hole 34 in the annular rib 35. A mounting base plate 62 which constitutes a base portion of the float sensors 61 is bolted to the annular rib 35 so as to close the through hole 34 from thereabove.

The ion-exchange resin 16 is loaded in a space defined by the container tank 11, the upper filter 13, the lower filter 14, and the water passage pipe 15. The ion-exchange resin 16 is a non-soluble synthetic resin which removes positive ions ($Na^+$, $Ca^{2+}$, $Mg^{2+}$ and the like) and negative ions ($Cl^-$, $HCO_3^-$, and the like) from condensate flowing downward through the container space S, and the resin is made up of a resin base which is chemically inactive and an ion-exchange base.

Next, the operation of the water purification apparatus 10 of the fuel cell generation system which is configured as described above will be described below.

Condensate dripping down from a condenser (not shown) of the fuel cell generation system is supplied from the water supply pipe 38 into the water purification apparatus 10. The condensate is then discharged onto the water falling point P of the upper filter 13 which is positioned so as to correspond to the opening portion 44 to the container space S. Thereafter, the condensate spreads over the upper surface of the upper filter 13 while flowing into the container space S through the plurality of slit-shaped apertures 41. Since the plurality of slit-shaped apertures 41 are set so that their opening areas increase as the slit-shaped apertures 41 separate from the water falling point P, the flow rate of the condensate supplied into the container space S will never be uneven according to a location on the upper filter 13. That is, the condensate spreads over the whole surface of the upper filter 13 substantially at the same flow rate.

The condensate supplied into the container space S through the apertures 41 of the upper filter 13 contains metallic ions, inorganic ions, and organic substances. The ion exchanges are implemented between the condensate and the ion-exchange resin 16 while the condensate is flowing downward through the ion-exchange resin 16 from a top to a bottom thereof to thereby produce pure water. Air inside the container space S is discharged out of the container space S accordingly as the condensate flows into the container space S, and this air discharging operation is executed smoothly as a result that the projecting portion 43 of the upper filter 13 functions as the air reservoir portion. As a result, the condensate flows smoothly through the ion-exchange resin 16, whereby the condensate is allowed to flow into the container space S smoothly without any interruption.

Pure water obtained as a result of the condensate flowing downward through the ion-exchange resin 16 is accumulated in the lower space 51 lying below the lower filter 14 and is then discharged from the water conveyance pipe 27. The amount of pure water which is discharged from the water conveyance pipe 27 to be sent to a reformer is controlled by a pump, not shown, or the like. When an amount of pure water which is produced exceeds an amount of pure water which is discharged from the water conveyance pipe 27, extra pure water which is not discharged from the water conveyance pipe 27 is stored within the water passage pipe 15 from a bottom toward a top thereof. When an amount of extra pure water stored in the water passage pipe 15 increases and the water passage pipe 15 is filled with pure water, the extra pure water overflows from an upper end of the water passage pipe 15 through the overflow pipe 39. In this way, the water passage pipe 15 functions as a pure water tank where pure water is stored.

When a maintaining service is performed on the water purification apparatus 10 or the water purification apparatus 10 is not used for a long period of time, water staying inside the water purification apparatus 10 needs to be discharged entirely. As this occurs, water remaining in the water purification apparatus 10 is discharged from the discharge pipe 28 which communicates with the lower space 51. Water inside the lower space 51 is pure water which has passed through the ion-exchange resin 16, and therefore, only pure water is discharged from the discharge pipe 28, and there occurs no such situation that condensate is discharged from the discharge pipe 28.

Thus, as has been described heretofore, according to the embodiment of the invention, the water purification apparatus 10 includes the bottomed cylindrical container tank 11, the lid member 12 for fluid-tightly closing the opening portion 21 of the container tank 11 which opens upward, the upper filter 13 which is disposed at the upper portion of the container space S formed from the container tank 11 and the lid member 12 to form the upper space 52 between the lid member 12 and the upper filter 13, the lower filter 14 which is disposed at the lower portion of the container space S to form the lower space 51 between the bottom plate 25 of the container tank 11 and the lower filter 14, the water passage pipe 15 which passes through the upper filter 13 and the lower filter 14 and which is disposed substantially at the center of the container tank 11 to establish the communication between the upper space 52 and the lower space 51, and the ion-exchange resin 16 which is loaded in the space defined by the container tank 11, the upper filter 13, the lower filter 14 and the water passage pipe 15. The lid member 12 has the water supply pipe 38 for supplying water to the upper space 52 and the overflow pipe 39 which connects to the water passage pipe 15, and the water conveyance pipe 27 for discharging the pure water in the container tank 11 to outside is connected to the lower space 51. Therefore, the pure water is discharged from the water conveyance pipe 27. The extra pure water which is not discharged from the water conveyance pipe 27 is stored in the water passage pipe 15. When the water passage pipe 15 is filled with the pure water so stored, the extra pure water overflows from the upper end of the water passage pipe 15 by way of the overflow pipe 39. In this way, since the water passage pipe 15 in the container tank 11 can be made use of as the pure water storage tank, there is no need to provide a tank for storing pure water produced by the water purification apparatus 10 in the fuel cell generation system. As a result, it is possible to realize a reduction in costs and installation space of the fuel cell generation system.

In addition, since the discharge pipe 28, which is different from the water conveyance pipe 27, for discharging pure water inside the container tank 11 is connected to the lower space 51. When water remaining in the container tank 11 needs to be discharged to empty the container tank 11, the water remaining in the container tank 11 is discharged from the discharge pipe 28 connected to the lower space 51. The water discharged through the discharge pipe 28 is pure water which has passed through the ion-exchange resin 16, and neither condensate nor a mixture containing condensate is discharged, thereby making it possible to reduce the influence of the discharged water on soil or water in environment.

In addition, since the container tank 11 has the cylindrical shape and the upper filter 13 has the slit-shaped apertures 41 whose opening areas increase as the slit-shaped apertures 41 separate from the water falling point P where condensate supplied from the water supply pipe 38 falls, the flow rate of water supplied into the container space S will never be uneven according to a location on the upper filter 13, thereby making it possible to realize the uniform flow rate. As a result, condensate is supplied into the container space S in such a state that condensate is allowed to flow over the whole surface of the upper filter 13 at substantially the same flow rate, whereby the utilization factor of the ion-exchange resin 16 can be made to average out.

Further, the upper filter 13 has the projecting portion 43 which is formed around the water passage pipe 15 and is recessed toward the upper space 52, and the projecting portion 43 functions as the air reservoir portion for air that is discharged from the container space S accordingly as condensate flows into the container space S. This promotes the replacement of air contained in the container space S with condensate supplied from the water supply pipe 38, whereby condensate flows smoothly into the container space S.

The invention is not limited to the embodiment that has been described heretofore and hence can be modified or improved as required.

DESCRIPTION OF REFERENCE NUMERALS AND CHARACTERS

10 Water purification apparatus
11 Container tank
12 Lid member
13 Upper filter
14 Lower filter
15 Water passage pipe
16 Ion-exchange resin
21 Opening portion
25 Bottom plate
27 Water conveyance pipe
28 Discharge pipe
38 Water supply pipe
39 Overflow pipe
41 Aperture
43 Projecting portion
51 Lower space
52 Upper space
P Water falling point
S Container space

The invention claimed is:

1. A water purification apparatus of a fuel cell generation system, which refines water generated as a result of electric power generation in a fuel cell to produce pure water, comprising:
   a bottomed cylindrical container tank;
   a lid member for fluid-tightly closing an opening portion which opens upward of the container tank;
   an upper filter which is disposed at an upper portion of a container space formed from the container tank and the lid member, and which forms an upper space between the lid member and the upper filter;
   a lower filter which is disposed at a lower portion of the container space, and which forms a lower space between a bottom portion of the container tank and the lower filter;
   a water passage pipe which passes through the upper filter and the lower filter, and which is disposed substantially at a center of the container tank to establish a communication between the upper space and the lower space; and
   an ion-exchange resin which is loaded in a space defined by the container tank, the upper filter, the lower filter, and the water passage pipe,
   wherein the lid member has a water supply channel for supplying the water to the upper space, and an overflow channel which connects to the water passage pipe,
   a first discharge channel for discharging the pure water in the container tank to outside is connected to the lower space,
   the water passage pipe is imperforate and provides an unobstructed passage from the lower space to the upper space,
   the cylindrical container tank includes an annular tank portion located below the lower filter, the first discharge channel extends through the annular tank portion into the lower space, and a second discharge channel for discharging the pure water which is different from the first discharge channel extends through the annular tank portion into the lower space.

2. The water purification apparatus of the fuel cell generation system according to claim 1,
   wherein the container tank has a cylindrical shape, and the upper filter has a slit-shaped aperture whose opening area increases as the slit-shaped aperture separates from a water falling point where the water supplied from the water supply channel falls.

3. The water purification apparatus of the fuel cell generation system according to claim 1,
wherein the upper filter has an air reservoir portion which is recessed toward the upper space on a circumference of the water passage pipe.

4. The water purification apparatus of the fuel cell generation system according to claim 1,
wherein the water is condensate resulting from recovering water contained in exhaust gas discharged from the fuel cell.

* * * * *